US011410617B2

(12) United States Patent
Shintani

(10) Patent No.: US 11,410,617 B2
(45) Date of Patent: Aug. 9, 2022

(54) LIGHT SOURCE CONTROL FOR DISPLAYING VIDEO

(71) Applicant: Saturn Licensing LLC, New York, NY (US)

(72) Inventor: Peter Shintani, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 30 days.

(21) Appl. No.: 17/129,597

(22) Filed: Dec. 21, 2020

(65) Prior Publication Data

US 2021/0110777 A1 Apr. 15, 2021

Related U.S. Application Data

(63) Continuation of application No. 16/409,391, filed on May 10, 2019, now Pat. No. 10,902,797, which is a
(Continued)

(51) Int. Cl.
*G09G 3/34* (2006.01)
*G09G 5/36* (2006.01)
(Continued)

(52) U.S. Cl.
CPC ........... *G09G 3/3406* (2013.01); *G09G 5/363* (2013.01); *G09G 2310/0237* (2013.01); *G09G 2320/0209* (2013.01); *G09G 2320/0233* (2013.01); *G09G 2320/0247* (2013.01); *G09G 2320/0261* (2013.01); *G09G 2320/062* (2013.01); *G09G 2320/08* (2013.01); *G09G 2340/0435* (2013.01);
(Continued)

(58) Field of Classification Search
CPC . G02B 27/0172; G02B 27/0101; G06F 1/163; G09G 3/3406; G09G 5/363; H04N 5/46; H04N 7/0127
USPC ........................................................ 345/212
See application file for complete search history.

(56) References Cited

U.S. PATENT DOCUMENTS

| 2004/0114396 | A1* | 6/2004 | Kobayashi | ............ G02F 1/1336 362/555 |
| 2005/0068289 | A1 | 3/2005 | Diefenbaugh et al. | |

(Continued)

FOREIGN PATENT DOCUMENTS

EP 2 202 715 A2 6/2010

OTHER PUBLICATIONS

Extended European Search Report dated Apr. 9, 2019 in Patent Application No. 16844910.6, (23 pages).
(Continued)

*Primary Examiner* — Kwin Xie
(74) *Attorney, Agent, or Firm* — Richard LaPeruta

(57) ABSTRACT

A method for controlling a light source of a display is provided. In the method, maximum frame rates are determined for different portions of video content to be displayed on the display. The light source of the display is controlled to blink according to a blinking frequency when a first portion of the video content having a first maximum frame rate is displayed. First metadata of high dynamic range is received. The light source of the display is controlled to not blink when a second portion of the video content having a second maximum frame rate is displayed. The video content is displayed at the maximum frame rates and in the high dynamic range.

18 Claims, 12 Drawing Sheets

Related U.S. Application Data continuation of application No. 14/974,618, filed on Dec. 18, 2015, now Pat. No. 10,354,598.

(60) Provisional application No. 62/216,811, filed on Sep. 10, 2015.

(51) Int. Cl.
 H04N 5/46 (2006.01)
 H04N 7/01 (2006.01)

(52) U.S. Cl.
 CPC ..... *G09G 2360/02* (2013.01); *G09G 2370/04* (2013.01); *H04N 5/46* (2013.01); *H04N 7/0127* (2013.01)

(56) References Cited

U.S. PATENT DOCUMENTS

| | | | |
|---|---|---|---|
| 2009/0189974 A1* | 7/2009 | Deering | G02B 27/0093 348/51 |
| 2009/0327777 A1 | 12/2009 | Vasquez et al. | |
| 2010/0091048 A1* | 4/2010 | Aitken | G09G 3/3406 345/213 |
| 2010/0149167 A1 | 6/2010 | Hasegawa et al. | |
| 2010/0156866 A1 | 6/2010 | Yeo et al. | |
| 2011/0032231 A1 | 2/2011 | Maruyama et al. | |
| 2011/0175859 A1* | 7/2011 | Jang | G09G 3/3611 345/204 |
| 2012/0033042 A1 | 2/2012 | Mori et al. | |
| 2012/0092388 A1* | 4/2012 | Kamon | G09G 3/3426 345/88 |
| 2012/0249617 A1 | 10/2012 | Ikawa | |
| 2013/0141642 A1 | 6/2013 | Wu et al. | |
| 2013/0215241 A1* | 8/2013 | Onishi | H04N 13/122 348/51 |
| 2014/0098886 A1* | 4/2014 | Crenshaw | H04N 19/33 375/240.16 |
| 2014/0184914 A1 | 7/2014 | Oshima et al. | |
| 2015/0109346 A1* | 4/2015 | Taniguchi | G09G 3/3406 345/102 |
| 2015/0135209 A1* | 5/2015 | LaBosco | H04N 21/43615 725/31 |

OTHER PUBLICATIONS

International Search Report and Written Opinion dated Dec. 29, 2016 in PCT/US2016/049891.

\* cited by examiner

LIGHT SOURCE CONTROL FOR DISPLAYING VIDEO

CROSS REFERENCE

This application is a continuation of U.S. Ser. No. 16/409,391 filed on May 10, 2019, which is a continuation of U.S. Ser. No. 14/974,618 filed Dec. 18, 2015 now U.S. Pat. No. 10,354,598 issued on Jul. 16, 2019, which claims the benefit of priority from U.S. Provisional Application No. 62/216,811 filed Sep. 10, 2015, the entire contents of which are incorporated herein by reference.

TECHNICAL FIELD

The present disclosure relates to methods, apparatuses, systems, and computer-readable mediums for controlling one or more light sources used to display video.

BACKGROUND

Advances in video capture technology allow for video data to be captured at higher frame rates. However, display devices are not always able to display the captured video at such higher frame rates. In order to provide high quality video, display devices should be able to update the presented video images at a sufficiently fast rate to avoid cross-talk between sequential images. Thus, in order to provide a smooth visual user experience, it is desirable for a display device to present video data at a high frame rate.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

According to an embodiment of the present disclosure, there is provided a method of controlling a display for displaying video content. The method includes determining, by processing circuitry, a blinking frequency to be used during presentation of video content for a light source of a display. The blinking frequency for the light source of the display is set by the processing circuitry based on the determined blinking frequency. Further, the light source of the display is controlled by the processing circuitry to blink according to the set blinking frequency while the video content is presented on the display. The light source is configured to illuminate a separate display panel or to emit light that form images of the video content.

According to an embodiment of the present disclosure, there is provided a non-transitory computer-readable medium storing instructions which, when executed by at least one processor, cause the at least one processor to perform the above-described method of controlling the display for display video content.

According to an embodiment of the present disclosure, there is provided a display apparatus. The display apparatus comprises light source configured to illuminate a separate display panel or to emit light that form images of video content. Further, the display apparatus comprises processing circuitry configured to determine a blinking frequency to be used during presentation of the video content for the light source of a display. The processing circuitry sets the blinking frequency for the light source of the display based on the determined blinking frequency. Further, the processing circuitry controls the light source of the display to blink according to the set blinking frequency while the video content is presented on the display.

According to an embodiment of the present disclosure, there is provided a method for transmitting video content. The method includes generating, by processing circuitry, a first data stream of the video content. The first data stream includes a first subset of frames of the video content that is presentable at a first frame rate. A second data stream of the video content is generated by the processing circuitry. The second data stream includes a second subset of frames of the video content which in combination with the first subset of frames are presentable at a second frame rate. Further, the method includes transmitting, by a transmitter, the first data stream and the second data stream to a reception apparatus. The second frame rate is higher than the first frame rate.

According to an embodiment of the present disclosure, there is provided a non-transitory computer-readable medium storing instructions which, when executed by at least one processor, cause the at least one processor to perform the above-described method for transmitting video content.

According to an embodiment of the present disclosure, there is provided an information providing apparatus. The information providing apparatus includes processing circuitry configured to generate a first data stream of the video content and to generate a second data stream of the video content. The first data stream includes a first subset of frames of the video content that is presentable at a first frame rate. The second data stream includes a second subset of frames of the video content which in combination with the first subset of frames are presentable at a second frame rate. Further, the information providing apparatus comprises a transmitter configured to transmit the first data stream and the second data stream to a reception apparatus. The second frame rate is higher than the first frame rate.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
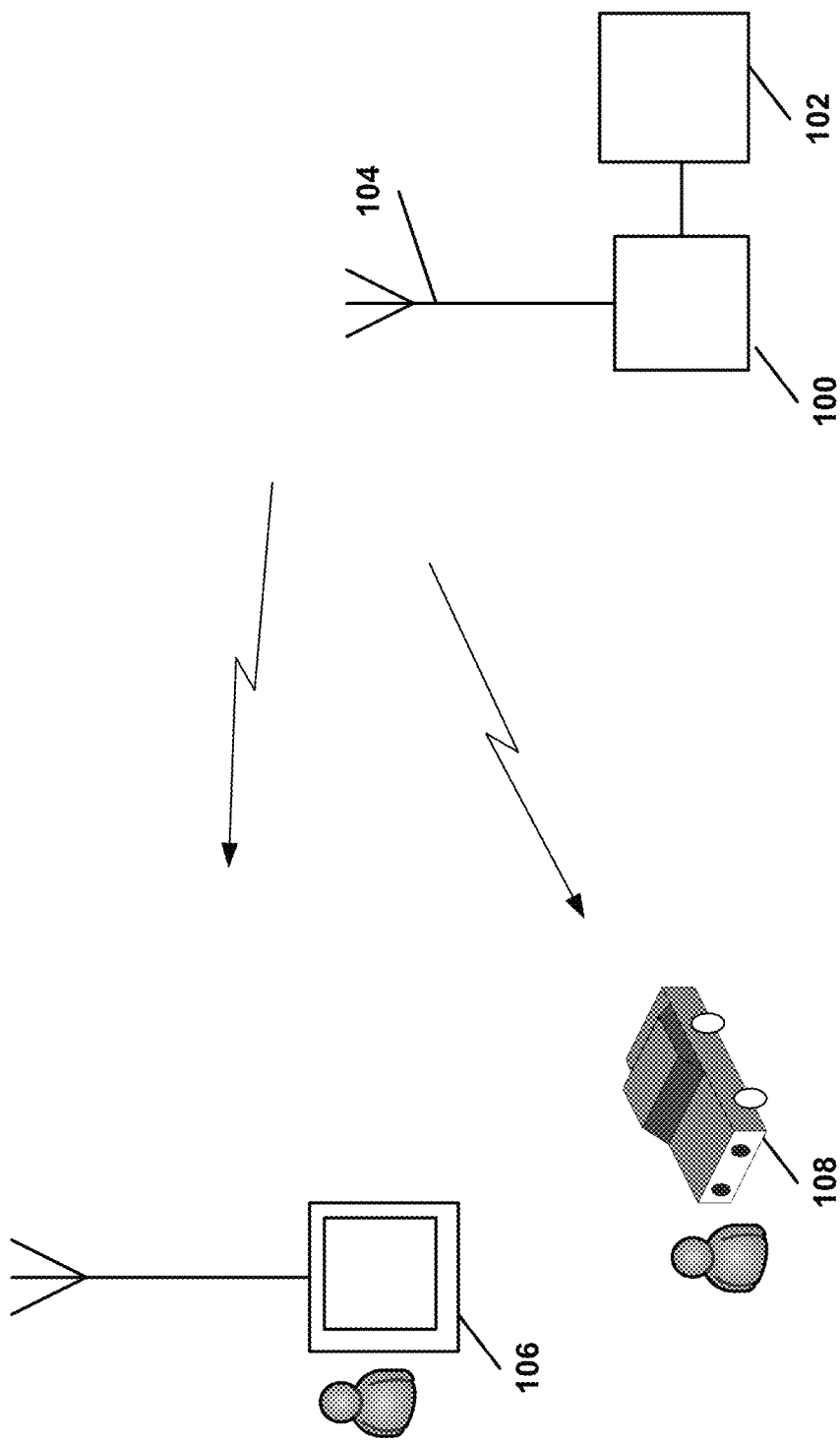
FIG. 1 is an exemplary system for broadcasting and receiving communication signals according to one example.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar, or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following description relates to the display of HFR (high frame rate) content, such as any content having a frame rate above 60 Hz, such as 120 Hz or 240 Hz. Generally speaking, the higher the number of frames per second, the smoother the video displayed appears to a user, especially in the case of content containing fast motion (e.g., sports). Frame rate can refer to the frequency at which an imaging device (e.g., a video camera) captures frames, or the frequency at which images are to be displayed for other types of frames (e.g., computer generated frames). The frame rate is often expressed in frames per second, fields per a second (e.g., for interlaced content), or Hertz.

Not all display devices are capable of displaying video at high frame rates due to display panel or other hardware constraints. Accordingly, in certain embodiments, HFR content refers to content having a higher frame rate than the capabilities of some display devices (e.g., legacy devices). For example, in order for a display device to display HFR content at double the frame rate, a display panel would have to run at double speed and a speed of a video pipeline would need to be doubled (e.g., twice the amount of memory, double actual video bus width), etc., when compared to display devices without HFR capabilities. Thus, additional expenses are incurred when the frame rate is doubled and some display devices may not be capable of running at high frame rates to reduce costs.

In certain embodiments, an apparent frame rate of the display (e.g., a television) is increased by controlling a light source of the display (e.g., an LED (light-emitting diode) or an OLED (organic light-emitting diode). In one embodiment, the light source illuminates a display element (e.g., a liquid crystal display), which generates the images for display. In another embodiment, the light source (e.g., an OLED display panel) itself generates the images for display. Although embodiments of the present disclosure are described with reference to a display, the embodiments are applicable to other types of devices such as projectors.

When HFR content is captured by a HFR camera (e.g., a 120 or 240 Hz camera), the camera's shutter typically opens the whole frame when it is shot. To decimate the HFR content to be shown on a display device without HFR capabilities (e.g., a legacy television set), one option is to discard frames. For example, every other frame may be discarded when the HFR content has a frame rate of 120 Hz but the display device without HFR capabilities is only capable of displaying content at 60 Hz. However, when frames are discarded in this manner, a shutter angle phenomenon may arise in which the content may appear jerky or strobed.

To address the shutter angle phenomenon, one option is to employ adaptive blurring or heavy video processing tricks to slightly blur an image with a discarded image (e.g., by merging the two image frames) so that it appears that the correct shutter speed is used for a presentation of the HFR content at the reduced frame rate. Alternatively, adjacent frames of the video content presented at the reduced frame rate may be merged for frame blurring. In one embodiment, this processing would need to be performed by a television set and after a HEVC decoder to reduce the amount of strobing for HFR content being displayed on a display device without HFR capabilities.

Embodiments of the present disclosure employ a blinking function to make motion smoother on display devices (e.g., televisions sets) that are not capable of displaying content at high frame rates to effectively raise the frame rate of the display device. For example, a light source of the display device is controlled to blink at 120 Hz for HFR content having a frame rate of 120 Hz. The blinking function is performed on any light source used to display the video content, such as a backlight for a display element or OLED display panel, as described above. The light source (e.g., a backlight for the display element) is blinked at a predetermined frequency to increase the apparent frame rate of the display.

The predetermined frequency may be determined based on metadata transmitted with a signal that indicates an original frame rate or blinking frequency for the video content. The original frame rate corresponds to the frame rate of the raw video of the video content. Alternatively, the predetermined frequency may be adjusted manually by the user. For example, manual adjustment may be required when the metadata is not available to the display device. The metadata may not be available, for example, when a terrestrial broadcast signal is retransmitted by another service provider, such as a cable television or mobile phone service provider. In addition, each user may adjust the blinking frequency according to their preference. That is, there is a subjective tradeoff between the blinking and the brightness of the display, so the user may adjust the predetermined frequency manually until a desired balance between strobing and brightness is reached.

An LCD (Liquid Crystal Display) is an example of a display element that does not generate light and is often illuminated by a light source to present images. For example, a backlight emits light to illuminate the images displayed on the LCD. The backlight typically remains on while the LCD is in an on state.

If the display instead flashes the backlights rapidly, the user sees the frame, then a moment of black (black frame), then the frame again. The frames are displayed sequentially. The blinking itself is not perceptible to the user. In one embodiment, each frame is shown twice per second. In addition, the duty cycle of the backlights may be varied in certain embodiments. This reduces motion blur.

FIG. 1 is an exemplary system for broadcasting and receiving a communication signal according to one example. The communication signal may be a digital television signal (e.g., a terrestrial television broadcast signal) carrying audio/video content, including HFR video content. The communication system includes a transmitter 100, a core network 102, an antenna 104, and a plurality of user devices. The user devices may be a television set 106, a terminal device (e.g., a set top box) connected to a separate display, a mobile device (e.g., a smartphone, tablet computer, laptop, portable computer), part of a vehicle entertainment system for a vehicle 108, or any other device configured to receive the communication signal.

In certain embodiments, the user devices are connected to an antenna, a cable, or fiber optics via reception circuitry to receive the communication signal. The reception circuitry may be configured to receive communication signals from a plurality of different service providers. The user device 106 includes the reception circuitry such as a digital television broadcast receiver, a cable television receiver, a satellite broadcast receiver, etc.

The core network 102 includes a signal source such as for example a television studio camera that captures video and audio data and converts the data into a signal which is transmitted to the transmitter 100. In one embodiment, the television studio camera is a HFR camera. Further, in certain embodiments, the core network 102 may include or is connected to a storage device (e.g., a memory or server) that stores audio/video content (e.g., standard frame rate and/or high frame rate content).

The transmitter 100 receives a signal including the audio/video content, and in certain embodiments metadata associated with the audio/video content, that is generated by the core network 102 and processes the signal into a form suitable for transmission as would be understood by one of ordinary skill in the art. The communication signal carrying the data from the core network 102 may be transmitted to the user devices one or a combination of a terrestrial broadcast, a cable connection, a satellite link, a cellular data link, or other communication networks such as the Internet. The system may use any one or a variety of transmission techniques to communicate data to the user devices, for example the system may use a single or multicarrier technique.

Figure 10:
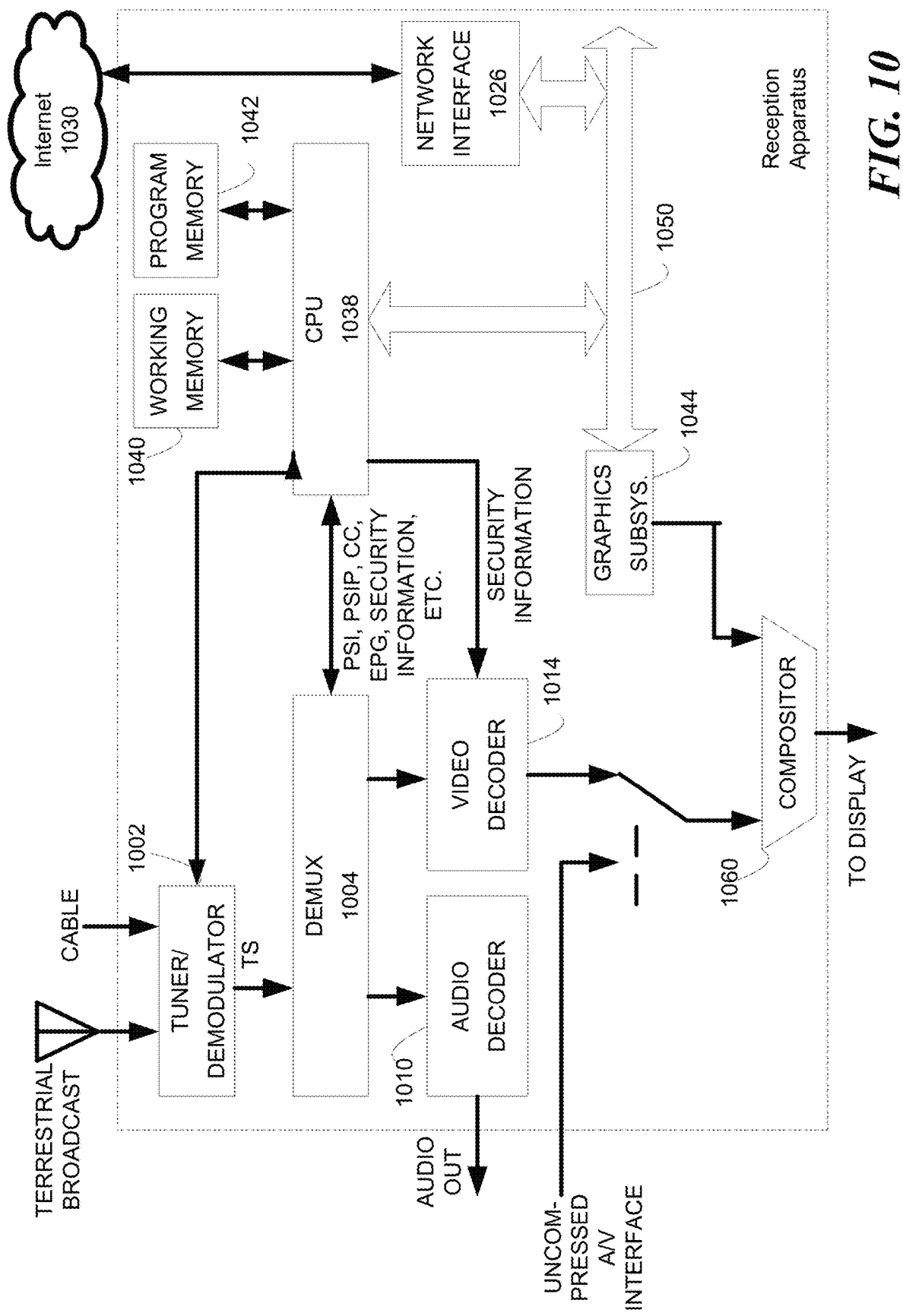
FIG. 10 illustrates an exemplary reception apparatus.

As it is understood by one of ordinary skill in the art, some of the components of the system shown in FIG. 1 may not be necessary. For example, the antennas are not required when the transmission system is not over-the-air but over a cable or fiber. The components of the transmitter and reception circuitry are dependent on the standard used by the broadcasting system. For example, details of an OFDM (Orthogonal Frequency Division Multiplexing) transmitter and receiver may be found in the DVB-T2 standard (ETSI EN 302 755), which is incorporated herein by reference in its entirety. An exemplary reception apparatus is shown in FIG. 10.

Figure 2:
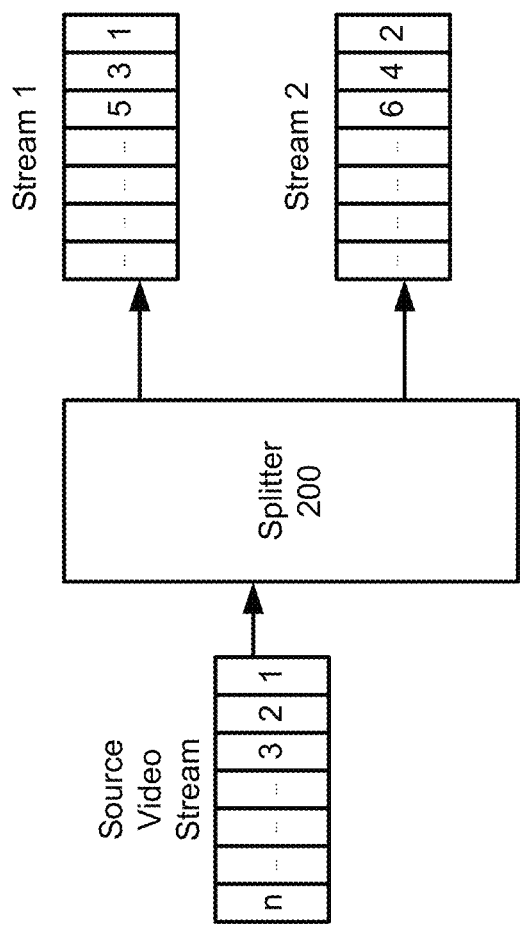
FIG. 2 is a schematic that shows video streams according to one example.

FIG. 2 is a schematic that shows video data streams for HFR video content according to one example. A source video data stream, having a high frame rate, is generated or retrieved by the core network 102 and is divided into two or more correlated layers. For example, the source video data stream, containing raw video, is partitioned into two subsequences of frames (e.g., one subset containing even frames and a second subset containing odd frames) which are coded into two separate bit streams.

A splitter 200 may receive the source video data stream and output the two or more streams. A first stream includes the odd frames. A second stream includes the even frames. In one example, the raw video has an original frame rate of 120 Hz or higher. The first and second streams have a rate of 60 Hz each. In another example, a first subsequence of frames contains the frames that are presentable at a first frame rate and a second subsequence of frames contains the frames, which in combination with the first subsequence of frames are presentable at a second frame rate. In this case, the first subsequence of frames is included in a base layer while the second subsequence of frames is included in an enhancement layer using for example the scalability extension of HEVC (High Efficiency Video Coding). An example of such layers is described in the DVB specification for the use of video and audio coding in broadcasting applications based on the MPEG-2 transport stream (ETSI TS 101 154 V2.1.1 2015-03), which is incorporated herein by reference in its entirety. The second frame rate (e.g., 120 or 240 Hz) corresponds to the frame rate of the raw video and is greater than the first frame rate (e.g., 60 Hz).

Figure 3:
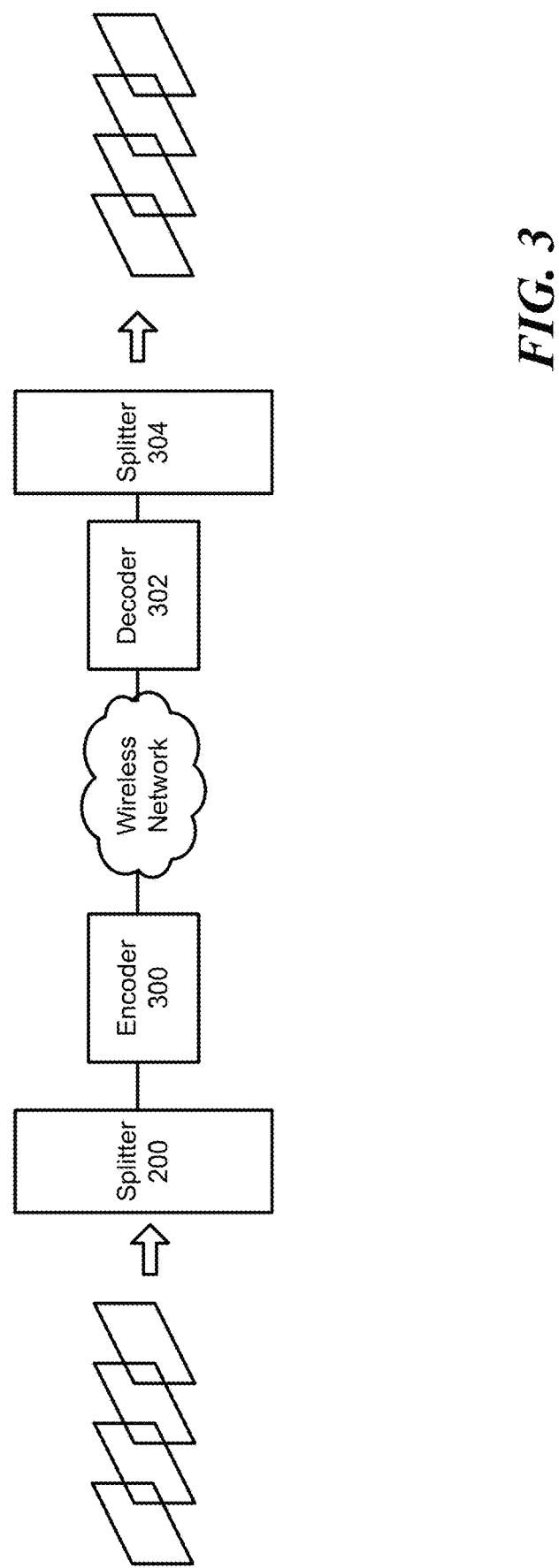
FIG. 3 is a schematic block diagram that shows a system for transmitting and receiving a video stream according to one example.

FIG. 3 is a schematic block diagram that shows a system for transmitting and receiving a HFR video data stream according to one example. The output from the splitter 200 may be fed to an encoder 300. In one embodiment, video streaming may be based on the H.264/AVC coding standard. The encoder 300 may be a H.264/SVC coder. The two streams are then transmitted through a wireless network (e.g., a digital television broadcast channel). A decoder 302 may receive the stream and output the stream to a second splitter 304 that separates the frames, or base and enhancement layers. In one embodiment, both streams are decoded, for example to produce the even and/or odd frames which may interleaved for final display. In one embodiment, when the display device is not capable of displaying HFR content or not all frames of the HFR content can be received (e.g., in the case of network congestion), only one of the set of even or odd frames is displayed.

The encoder 300 may include two separate encoders. Similarly, the decoder 302 may consist of two separate decoders, or a single decoder that alternates processing between the two streams.

Figure 4:
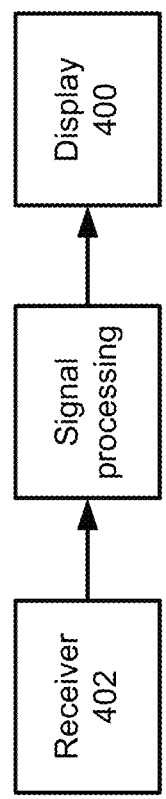
FIG. 4 is a schematic block diagram for a system to control a display according to one example.

FIG. 4 is a schematic block diagram for a system to control a display according to one example. The system may be an integral device (e.g., a television set) or include separate devices (e.g., a set top box connected to a display). A receiver 402 receives the audio/video content. The receiver 402 includes processing circuitry. An exemplary receiver is shown in FIG. 10. The receiver 402 may analyze using the processing circuitry the received streams of the A/V content, metadata data associated with the A/V content, and/or an input from the user to determine a blinking frequency which is based on the original frame rate of the raw video. Then, a display 400 is controlled based on the analysis.

In one embodiment, metadata transmitted with audio/video content indicates the original frame rate of the video content (for example, 120 Hz) or the blinking frequency. The processing circuitry may detect the original frame rate using the metadata. For example, a dynamic range and info frame may carry data such as standard high dynamic range (HDR) static metadata, Electro-optical transfer function (EOTF), and data to indicate the original (native) frame rate. In one example, the transmitter may send the dynamic range and the info frame once per video field while the transmitter is sending data associated with the dynamic range of the video stream. In another embodiment, the processing circuitry detects the original frame rate based on the number of separate bit streams for the video content or by analyzing the video content itself. The metadata may also include data to indicate a shutter angle used by the content when the content was captured (shot) or an effective shutter angle when the content was computer graphic generated. The metadata may also indicate average picture brightness information. The average picture brightness information may be used to determine a balance between brightness and the blinking frequency.

A blinking frequency for shutting off a light source (e.g., a backlight) of a display for displaying the audio/video content is set according to the original frame rate of the audio/video content according to certain embodiments, and in one embodiment is a function of the original frame rate. For example, the blinking frequency may be set based on the metadata indicating the original frame rate. In one embodiment, the blinking frequency is set according to a blinking frequency parameter included in the metadata received by the receiver 402. In this case, each service provider may customize the blinking frequencies for each of their content and in certain embodiments stop the blinking function during commercial breaks or other portions of the A/V content that do not have a high frame rate. In one embodiment, the blinking frequency is set based on a user input.

As described above, the blinking frequency may optionally be adjusted by a user of the reception apparatus. An input panel can be disposed, or an interface may be implemented by software, in the receiver 402 and used by a user to input blinking frequency parameters. In one embodiment, the user may input the original frame rate and the processing circuitry may determine the blinking backlight parameter (e.g., backlight blinking frequency) based on the original frame rate. In one example, when the original frame rate is determined to be below a predetermined threshold (e.g., 60 Hz), the backlight may be kept lit without blinking, for example when the A/V content has a standard frame rate or a static frame is to be presented. The predetermined threshold may be based on the display 400 and/or the capabilities (e.g., memory size/speed, processing capabilities, etc.) of the receiver 402. For example, the predetermined threshold may be equal to the refresh rate of the display 400.

Figure 5:
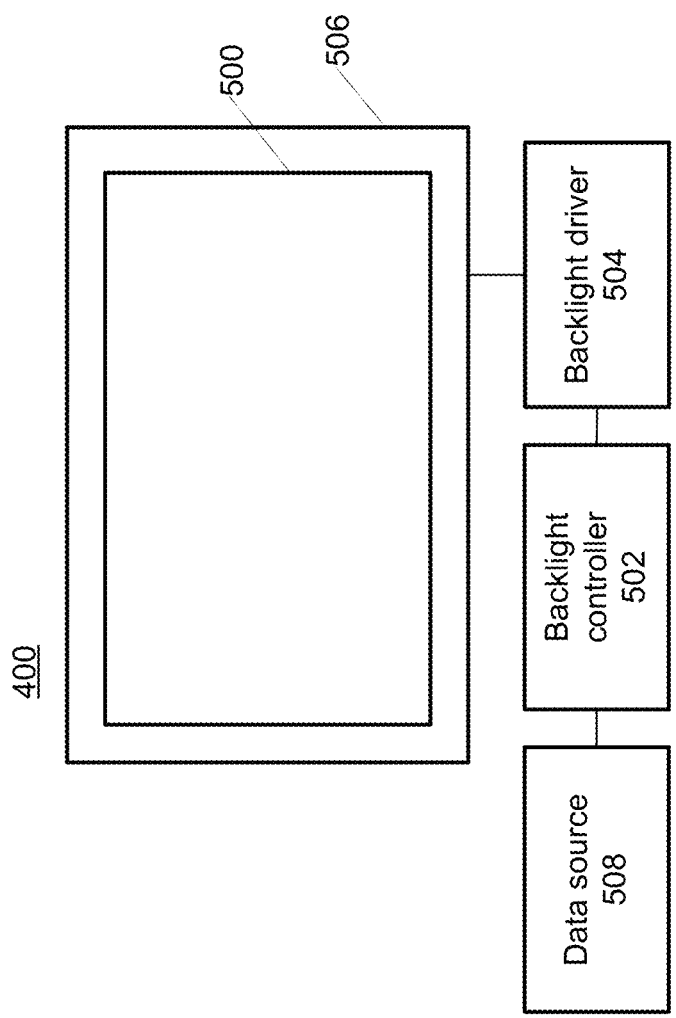
FIG. 5 is a schematic block diagram for a display according to one example.

FIG. 5 is a block diagram that shows a display employing a light source (e.g., a backlight) that illuminates a separate display element according to one example. The display 400 may include a display element (e.g., display panel 500), a backlight controller 502, a backlight driver 504, a light source 506 (e.g., a backlight), and a data source 508.

In one embodiment, the light source 506 is a backlight that illuminates the display panel 500. The light source 506 may be realized as, for example, an LED, CCFL (Cold Cathode Fluorescence Lamp), or EEFL (External Electrode Fluorescence Lamp). The display panel 500, which can be an LCD panel is provided with the backlighting. In one example, the light source 506 provides a backlight to the display 400 from the opposite side of the display panel 500, that is, the opposite side of the side where the image is displayed.

The backlight driver 504 drives the light source 506 under the control of the backlight controller 502. Specifically, the backlight driver 504 drives the light source 506 by generating a driving signal under the control of the backlight controller 502. In one embodiment, the backlight driver 504 controls a supply of power to the light source 506. The driving signal is generated based on the original frame rate, in one embodiment. The backlight controller 502 controls the backlight driver 504. The backlight controller 502 controls the backlight driver 504 so that a backlight-blinking rate corresponds to the original frame rate or another set blinking rate Once a blinking frequency is determined, the backlight controller 502 controls the backlight driver 504 to generate a driving signal according to the determined backlight frequency. Specifically, the backlight controller 502 may control the backlight driver 504 to generate a driving signal to drive the light based on the original frame rate. The blinking of the backlights increases the apparent response rate of the display and thus reduces ghosting.

The light source 506 may include a backlight array, which is a two-dimensional array of light sources. Such light sources may be arranged, for example, in a rectangular grid. Each light source in the backlight array is individually addressable and controllable by the backlight driver 504. The data source 506 can be a TV decoder, reception apparatus, a DVD player, a computer, or the like.

Figure 6:
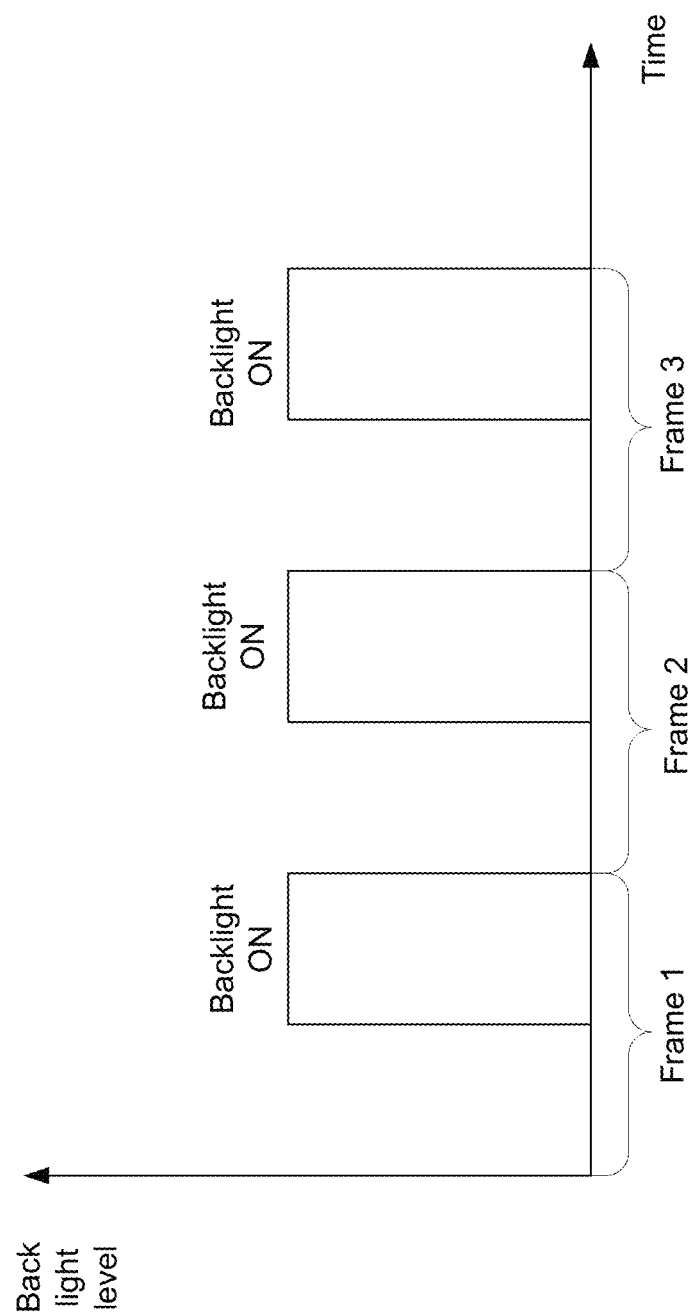
FIG. 6 is a schematic that illustrates a temporal screen.

FIG. 6 is a schematic that illustrates a temporal screen of the display of video frames at a frame rate that is lower than the original HFR content. The backlight has a frequency double that of the frame rate. In FIG. 6, the on off duty cycle is equal to 0.5 (50%). In another embodiment, the on off duty ratio can be varied. For example, the on off duty cycle may be set to 0.1 (10%). A lower on off duty cycle results in a lower average display brightness. For example, as described above, a user may manually adjust the on off duty ratio to increase or decrease the time a backlight remains on during the presentation of a video frame. In another embodiment, the on off duty ratio may be controlled based on, or identified in, information provided by the service provider.

Figure 7:
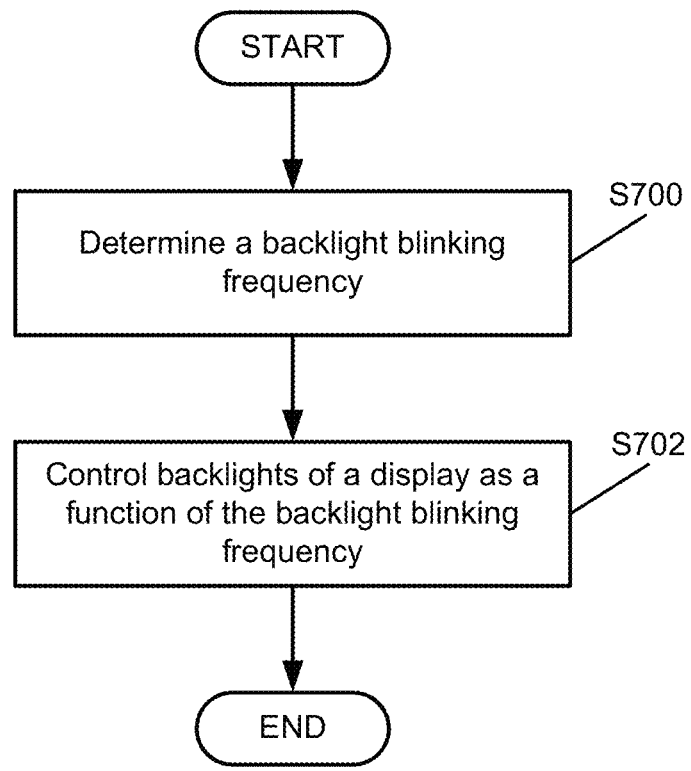
FIG. 7 is a flow chart that shows the operation of a receiver according to one example.

FIG. 7 is a flow chart illustrating the operation of a display according to one example. At step S700, the receiver determines a backlight blinking frequency. As described above, the backlight blinking frequency maybe determined based on the original frame rate of the raw video. For example, the backlight blinking frequency is set to the original frame rate of the raw video or a multiple thereof. In another example, the backlight blinking frequency is determined based on a user input or metadata that is associated with the HFR content. At step S702, a display of the content is modified by blinking the backlights of the display at the backlight blinking frequency.

Figure 8:
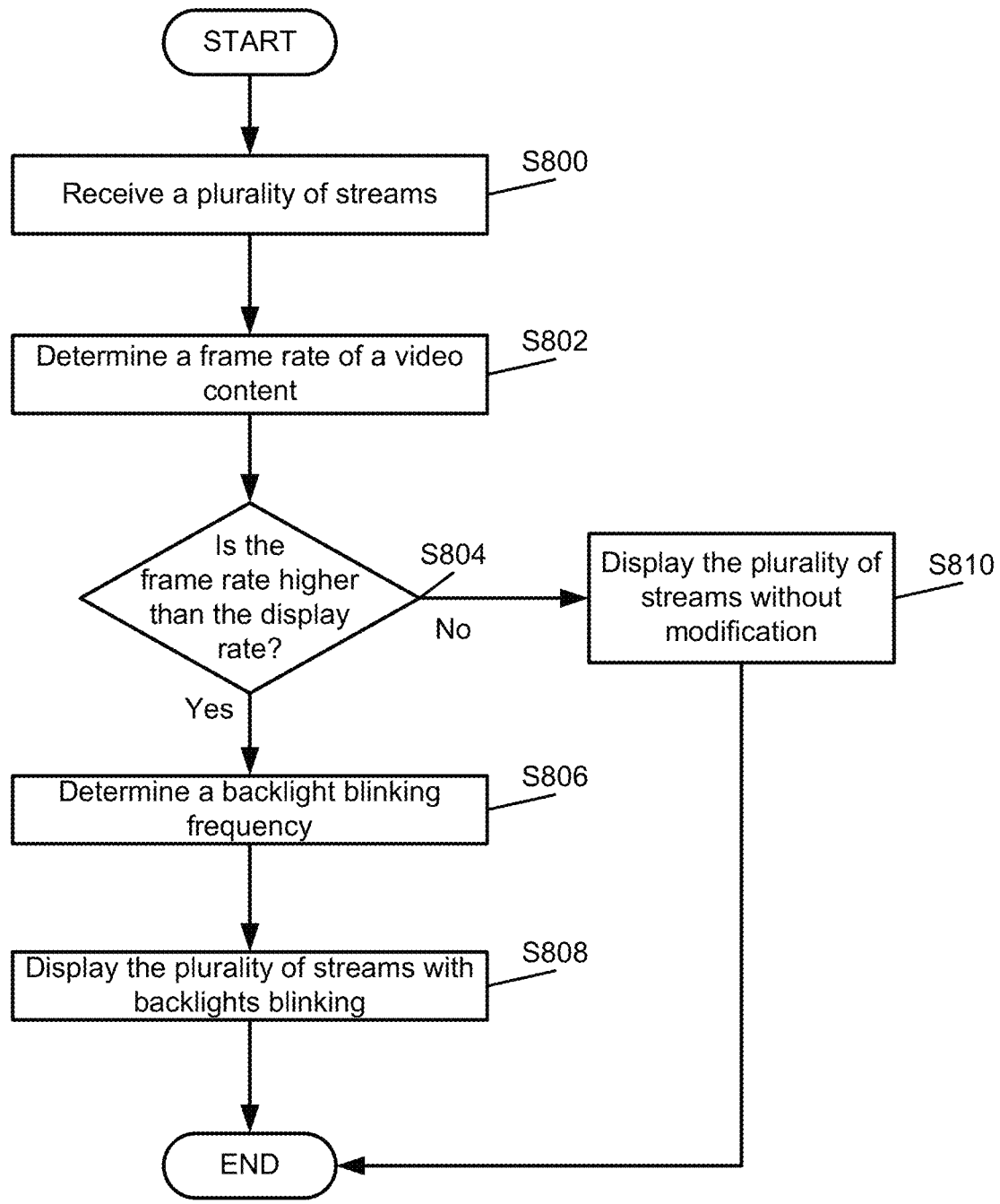
FIG. 8 is a flow chart that shows the operation of the receiver according to one example.

FIG. 8 is a flow chart illustrating the operation of a display according to one example. At step S800, the receiver may receive a plurality of streams. For example, the receiver 402 may receive two streams. The first stream represents the odd frames and the second stream represents the even frames. In another embodiment, the first stream contains the frames that are presentable at a first frame rate (i.e., a standard frame rate) and a second subsequence of frames contains the frames, which in combination with the first subsequence of frames are presentable at a second frame rate (i.e., the high frame rate).

At step S802, the receiver 402 determines an original frame rate of the plurality of streams. The original frame rate may be included in the metadata of the streams. The streams may represent video data. The video data may be provided from any suitable source, such as for example, television broadcast, Internet connection, file server, digital video disc, computer, video on demand, or broadcast. In other examples, the frame rate may be a predetermined rate stored in the memory. For example, the frame rate may be based on a type of programming or be service provider specific. The receiver 402 may use a look-up table to match the type of programming or service provider with a frame rate. The type of programing may be included in an electronic program guide. At step S804, the receiver 402 may check whether the frame rate is higher than the display rate of the display 400. In response to determining that the frame rate is higher than the display rate, the flow goes to step S806. In response to determining that the frame rate is lower than the display rate, the flow goes to step S810. At step S810, the backlight is kept constant. Step S808 is repeated for all the frames received.

At step S806, the receiver 402 may determine the backlight blinking frequency. The backlight blinking frequency may be equal to the original frame rate of the raw video. Then, at step S808, a first frame of the first stream is displayed. The backlight is blinked at the backlight blinking frequency. Then, in certain embodiments, a first frame of the second stream is displayed. Similarly, the backlight is blinked at the backlight blinking frequency.

Figure 9:
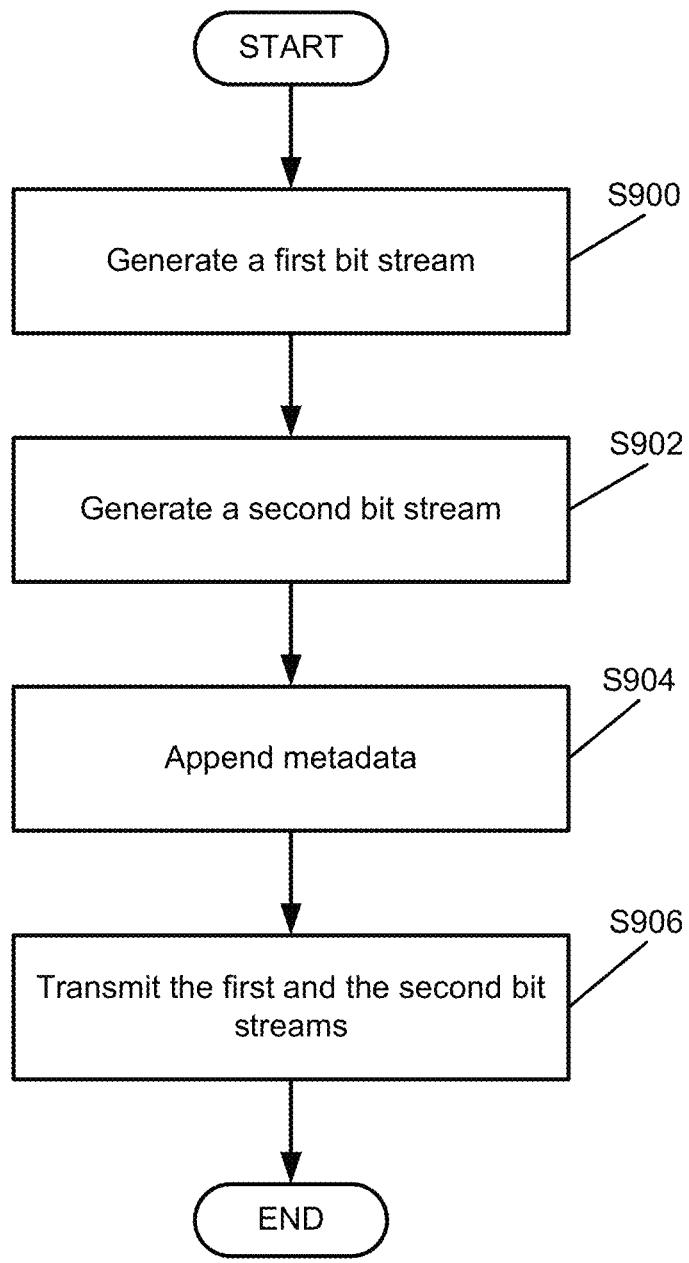
FIG. 9 is a flow chart that shows the operation of a transmitter according to one example.

FIG. 9 is a flow chart illustrating the illustration of the transmitter according to one example. At step S900, the transmitter 100, using processing circuitry, generates a first data stream. The first data stream includes a first subset of frames of the video content that is presentable at a first frame rate. For example, the first data stream includes the odd frames of the raw video as shown in FIG. 2. At step S902, the transmitter 100 generates a second data stream. The second data stream include a second subset of frames of the video content which in combination with the first subset of frames are presentable at a second frame rate. For example, the second data stream includes the even frames of the raw video. At step S904, the processing circuitry optionally appends metadata for transmission with the first and second data streams. The metadata may include at least the original frame rate of the raw video or indicate the blinking frequency for the video content. The metadata may also include system parameters as would be understood by one of ordinary skill in the art. At step S906, the first and the second data stream, optionally the metadata, are transmitted.

The reception apparatus is configured to receive a broadcast signal from a source signal. In one embodiment, the receiver 402 is one or more RF tuners that receives off-air analog (e.g. 54 and 864 MHz, or the like), off-air digital (e.g. Advanced Television system committee (ATSC) digital television (DTV), or the like), cable analog (e.g. National television system committee (NTSC), or the like, and/or cable digital (e.g., 64 QAM/256 QAM, or the like) signals. The tuner in the receiver is a single simple tuner that receives one signal type, a single flexible tuner that receives multiple signal types, two or more simple tuners where each tuner receives a different signal type, or two or more flexible tuners where each tuners is able to receive multiple signal types.

In one embodiment, an audio/video stream includes digital radio music channels that transmit an audio stream and may include an associated video image such as album cover art, song title, track information, artist information, and publisher information.

The receiver circuitry generally operates under control of at least one processor, such as a CPU, which is coupled to memory, program memory, and a graphics subsystem via one or more buses. An exemplary computer for controlling the receiver circuitry is further described below with respect to FIG. 12. Similarly, the transmission circuitry is operated under control of at least one processor.

FIG. 10 illustrates an exemplary reception apparatus, which is configured to implement the process of FIGS. 7 and 8 in certain embodiments. The reception apparatus includes a digital television receiver device that is incorporated into a fixed or mobile device such as a television set, a set top box, smartphone, tablet computer, laptop, portable computer, or any other device configured to receive television content. The reception apparatus may also be incorporated in a vehicle.

The reception apparatus includes a tuner/demodulator 1002, which receives digital television broadcast signals from one or more content sources (e.g., content source) via, for example, a terrestrial broadcast. Depending on the embodiment, the reception apparatus may alternatively or additionally be configured to receive a cable television transmission or a satellite broadcast. The tuner/demodulator 1002 receives a signal, including for example an MPEG-2 TS or IP packets, which may be demultiplexed by the demultiplexer 1004 or handled by middleware and separated into audio and video (A/V) streams. The audio is decoded by an audio decoder 1010 and the video is decoded by a video decoder 1014. Further, uncompressed A/V data may be received via an uncompressed A/V interface (e.g., a HDMI interface), if available.

A storage unit (e.g., a memory) may be provided to store non real time content (NRT) or Internet-delivered content such as Internet Protocol Television (IPTV). The stored content can be played by demultiplexing the content stored in the storage unit by the demultiplexer 1004 in a manner similar to that of other sources of content. Alternatively, the stored content may be processed and presented to the user by the CPU 1038. The storage unit may also store any other supplemental data acquired by the reception apparatus.

The reception apparatus generally operates under control of at least one processor, such as the CPU 1038, which is coupled to a working memory 1040, program memory 1042, and a graphics subsystem 1044 via one or more buses (e.g., bus 1050). The CPU 1038 receives closed caption data from the demultiplexer 1004 as well as any other supplemental data used for rendering graphics, and passes appropriate instructions and data to the graphics subsystem 1044. The graphics outputted by the graphics subsystem 1044 are combined with video images by the compositor and video interface 1060 to produce an output suitable for display on a video display.

Further, the CPU 1038 operates to carry out functions of the reception apparatus including any processing required to cause a light source to blink, as described herein. Although not illustrated in FIG. 10, the CPU 1038 may be coupled to any one or a combination of the reception apparatus resources to centralize control of one or more functions. In one embodiment, the CPU 1038 also operates to oversee control of the reception apparatus including the tuner/demodulator 1002 and other television resources. For example, FIG. 11 shows one implementation of CPU 1038.

Figure 11:
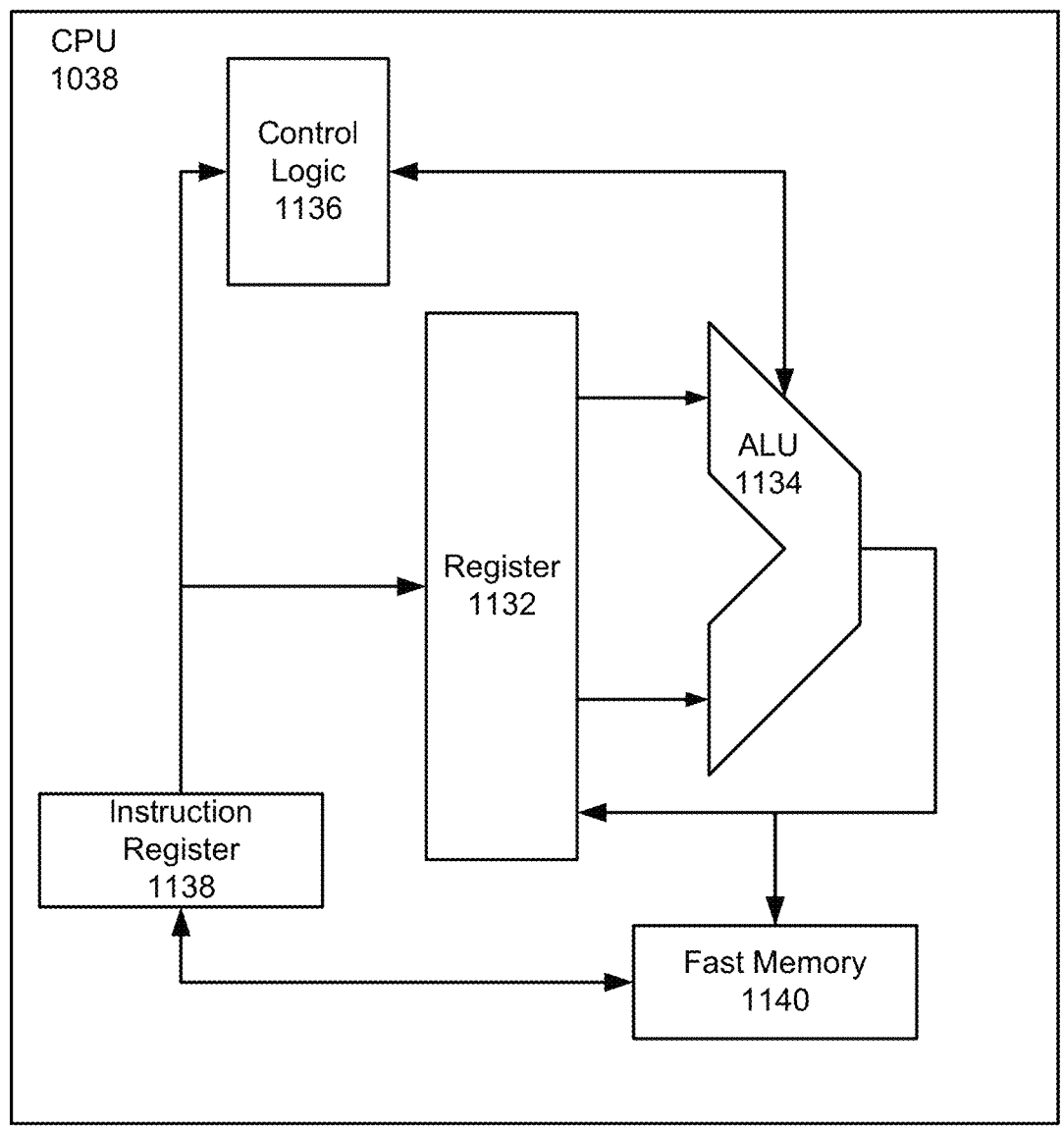
FIG. 11 is an exemplary block diagram of a central processing unit according to one example.

FIG. 11 illustrates one implementation of CPU 1038, in which the instruction register 1138 retrieves instructions from the fast memory 1140. At least part of these instructions are fetched from the instruction register 1138 by the control logic 1136 and interpreted according to the instruction set architecture of the CPU 1038. Part of the instructions can also be directed to the register 1132. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1038 can use a reduced instruction set architecture, a complex instruction set architecture, a vector processor architecture, a very large instruction word architecture. Furthermore, the CPU 1038 can be based on the Von Neuman model or the Harvard model. The CPU 1038 can be a digital signal processor, an FPGA, an ASIC, a PLA, a PLD, or a CPLD. Further, the CPU 1038 can be an x86 processor by Intel or by AMD; an ARM processor, a Power architecture processor by, e.g., IBM; a SPARC architecture processor by Sun Microsystems or by Oracle; or other known CPU architecture.

Figure 12:
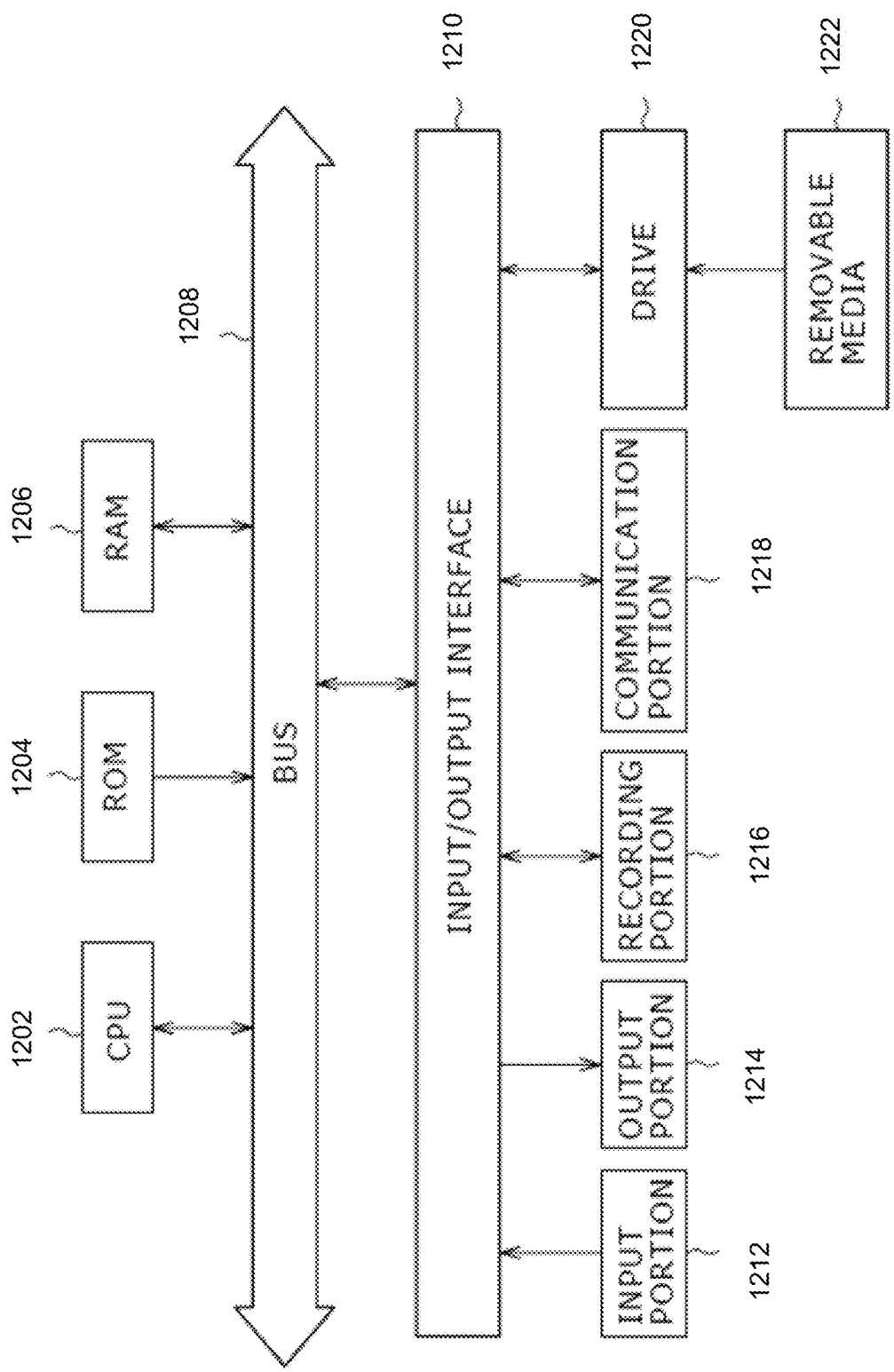
FIG. 12 is a block diagram showing an example of a hardware configuration of a computer.

FIG. 12 is a block diagram showing an example of a hardware configuration of a computer that can be configured to perform functions of any one or a combination of reception apparatus and transmission apparatus. For example, in one embodiment, the computer is configured to perform the functions in the digital domain, such as the splitter 200, the encoder 300, the transmitter 100, the decoder 302, the receiver 402, the backlight controller 502, the backlight driver 504, or the reception apparatus.

As illustrated in FIG. 12 the computer includes a central processing unit (CPU) 1202, read only memory (ROM) 1204, and a random access memory (RAM) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected an output portion 1214 formed by an audio interface, video interface, display, speaker and the like; a recording portion 1216 formed by a hard disk, a non-volatile memory or other non-transitory computer readable storage medium; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or combination of the splitter 200, the encoder 300, the transmitter 100, the decoder 302, the receiver 402, the backlight controller 502, the backlight driver 504, or the reception apparatus. The hardware description above, exemplified by any one of the structure examples shown in FIGS. 11 and 12, constitutes or includes specialized corresponding structure that is programmed or configured to perform the algorithm shown in FIGS. 7, 8, and 9. For example, the algorithm shown in FIG. 7 may be completely performed by the circuitry included in the single device shown in FIG. 12.

Obviously, numerous modifications and variations are possible in light of the above teachings. It is therefore to be understood that within the scope of the appended claims, the embodiments of the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments noted below.

(1) A method of controlling a display for displaying video content, the method including determining, by processing circuitry, a blinking frequency to be used during presentation of video content for a light source of a display; setting, by the processing circuitry, the blinking frequency for the light source of the display based on the determined blinking frequency; and controlling, by the processing circuitry, the light source of the display to blink according to the set blinking frequency while the video content is presented on the display, wherein the light source is configured to illuminate a separate display panel or to emit light that form images of the video content.

(2) The method of feature (1), wherein the step of determining includes determining a frame rate of the video content, and determining the blinking frequency of the light source of the display according to the determined frame rate of the video content.

(3) The method of feature (1) or (2), wherein the step of determining includes determining the blinking frequency of the light source of the display based on metadata that is associated with the video content, the metadata indicating one or a combination of the frame rate of the video content and a predetermined blinking frequency for the video content.

(4) The method of feature (3), wherein the metadata indicates a shutter angle when the video content is shot or an effective shutter angle when the video content is computer graphic generated.

(5) The method of feature (3) or (4), wherein the metadata indicates an average picture brightness.

(6) The method of any of features (1) to (5), wherein the step of controlling includes controlling a supply of power to the light source according to the set blinking.

(7) The method of any of features (1) to (6), wherein the light source is a backlight, and the step of controlling includes controlling the backlight to blink at the set blinking frequency.

(8) The method of any of features (1) to (7), further including receiving, by a receiver, first and second data streams of the video content, the first data stream including a first subset of frames of the video content that are presentable at a first frame rate, and the second data stream including a second subset of frames of the video content which in combination with the first subset of frames are presentable at a second frame rate; and outputting, for presentation on the display, the images of the video content included in only one of the first and second data streams, wherein the second frame rate is higher than the first frame rate.

(9) The method of any of features (1) to (8), wherein the step of setting includes setting the blinking frequency to a frame rate of the video content.

(10) The method of any of features (1) to (9), wherein the step of setting includes setting the blinking frequency to 0 Hz when a frame rate of the video content is lower than a predetermined refresh rate of the display.

(11) The method of feature (10), further including receiving, by a receiver configured to receive a terrestrial broadcast signal including the video content, a terrestrial broadcast signal including the video content, wherein the predetermined refresh rate is 60 Hz.

(12) A display apparatus, including a light source configured to illuminate a separate display panel or to emit light that form images of video content; and processing circuitry configured to determine a blinking frequency to be used during presentation of the video content for the light source of a display; set the blinking frequency for the light source of the display based on the determined blinking frequency; and control the light source of the display to blink according to the set blinking frequency while the video content is presented on the display.

(13) The display apparatus of feature (12), wherein the processing circuitry is configured to determine a frame rate of the video content, and determine the blinking frequency of the light source of the display according to the determined frame rate of the video content.

(14) The display apparatus of feature (12) or (13), wherein the processing circuitry is configured to determine the blinking frequency of the light source of the display based on metadata that is associated with the video content, the metadata indicating one or a combination of the frame rate of the video content and a predetermined blinking frequency for the video content.

(15) The display apparatus of feature (14), wherein the metadata indicates a shutter angle when the video content is shot or an effective shutter angle when the video content is computer graphic generated.

(16) The display apparatus of feature (14) or (15), wherein the metadata indicates an average picture brightness.

(17) The display apparatus of any of features (12) to (16), wherein the processing circuitry is configured to control a supply of power to the light source according to the set blinking frequency.

(18) The display apparatus of any of features (12) to (17), wherein the light source is a backlight, and the processing circuitry is configured to control the backlight to blink at the set blinking frequency.

(19) The display apparatus of any of features (12) to (18), further including a receiver configured to first and second data streams of the video content, the first data stream including a first subset of frames of the video content that are presentable at a first frame rate, and the second data stream including a second subset of frames of the video content which in combination with the first subset of frames are presentable at a second frame rate, wherein the processing circuitry is configured to output, for presentation on the display, the images of the video content included in only the first data stream, and the second frame rate is higher than the first frame rate.

(20) The display apparatus of any of features (12) to (19), wherein the processing circuitry is configured to set the blinking frequency to a frame rate of the video content.

(21) The display apparatus of any of features (12) to (20), wherein the processing circuitry is configured to set the blinking frequency to 0 Hz when a frame rate of the video content is lower than a predetermined refresh rate of the display.

(22) A method for transmitting video content, the method including generating, by processing circuitry, a first data stream of the video content, the first data stream including a first subset of frames of the video content that is presentable at a first frame rate; generating, by the processing circuitry, a second data stream of the video content, the second data stream including a second subset of frames of the video content which in combination with the first subset of frames are presentable at a second frame rate; and transmitting, by a transmitter, the first data stream and the second data stream to a reception apparatus, wherein the second frame rate is higher than the first frame rate.

(23) The method of feature (22), further including generating a broadcast signal including the first data stream, the second data stream, and metadata associated with the video content, wherein the metadata indicates one or a combination of the frame rate of the video content and a predetermined blinking frequency for the video content.

(24) The method of feature (23), wherein the metadata indicates a shutter angle when the video content is shot or an effective shutter angle when the video content is computer graphic generated.

(25) The method of feature (23) or (24), wherein the metadata indicates an average picture brightness.

(26) An information providing apparatus, including processing circuitry configured to generate a first data stream of the video content, the first data stream including a first subset of frames of the video content that is presentable at a first frame rate, and generate a second data stream of the video content, the second data stream including a second subset of frames of the video content which in combination with the first subset of frames are presentable at a second frame rate, and a transmitter configured to transmit the first data stream and the second data stream to a reception apparatus, wherein the second frame rate is higher than the first frame rate.

(27) The information providing apparatus of feature (26), wherein the processing circuitry is configured to generate a broadcast signal including the first data stream, the second data stream, and metadata associated with the video content, wherein the metadata indicates one or a combination of the frame rate of the video content and a predetermined blinking frequency for the video content.

(28) The information providing apparatus of feature (27), wherein the metadata indicates a shutter angle when the video content is shot or an effective shutter angle when the video content is computer graphic generated.

(29) The information providing apparatus of feature (27) or (28), wherein the metadata indicates an average picture brightness.

(30) A non-transitory computer-readable medium storing instructions, which when executed by at least one processor cause the at least one processor to perform the method of any one of features (1) to (11).

(31) A non-transitory computer-readable medium storing instructions, which when executed by at least one processor cause the at least one processor to perform the method of any one of features (22) to (25).

The invention claimed is:

1. A method for controlling a light source of a display, the method comprising:
   determining maximum frame rates for different portions of video content to be displayed on the display;
   controlling, by processing circuitry, the light source of the display to blink according to a blinking frequency when a first portion of the video content having a first maximum frame rate is displayed;
   receiving first metadata of high dynamic range;
   controlling, by the processing circuitry, the light source of the display to not blink when a second portion of the video content having a second maximum frame rate is displayed; and
   displaying the video content at the maximum frame rates and in the high dynamic range, wherein
   the first maximum frame rate exceeds a predetermined frame rate of the display, and
   the second maximum frame rate does not exceed the predetermined frame rate of the display.

2. The method according to claim 1, further comprising:
   determining the blinking frequency of the light source based on the first maximum frame rate.

3. The method according to claim 1, further comprising:
   determining the blinking frequency of the light source based on second metadata that is associated with the video content, the second metadata indicating the first maximum frame rate.

4. The method according to claim 1, wherein the controlling the light source of the display to blink comprises:
   controlling a supply of power to the light source according to the blinking frequency.

5. The method according to claim 1, wherein
   the light source is a backlight, and
   the controlling the light source of the display to blink includes controlling the backlight to blink at the blinking frequency.

6. The method according to claim 1, further comprising:
   setting the blinking frequency to the first maximum frame rate when the first portion of the video content having the first maximum frame rate is displayed.

7. The method according to claim 1, wherein the controlling the light source of the display to not blink comprises:
   setting the blinking frequency to 0 Hz.

8. The method according to claim 1, further comprising:
   receiving, by a receiver, a terrestrial broadcast signal including the video content.

9. An apparatus, comprising:
   processing circuitry configured to
   determine maximum frame rates for different portions of video content to be displayed on a display,
   control a light source of the display to blink according to a blinking frequency when a first portion of the video content having a first maximum frame rate is displayed, and
   control the light source of the display to not blink when a second portion of the video content having a second maximum frame rate is displayed,
   receive first metadata of high dynamic range, and
   display the video content at the maximum frame rates and in the high dynamic range.

10. The apparatus according to claim 9, wherein the processing circuitry is configured to determine the blinking frequency of the light source based on the first maximum frame rate.

11. The apparatus according to claim 9, wherein the processing circuitry is configured to
    determine the blinking frequency of the light source based on second metadata that is associated with the video content, the second metadata indicating the first maximum frame rate.

12. The apparatus according to claim 9, wherein the processing circuitry is configured to
    control a supply of power to the light source according to the blinking frequency.

13. The apparatus according to claim 9, wherein
    the light source is a backlight, and
    the processing circuitry is configured to control the backlight to blink at the blinking frequency when the first portion of the video content having the first maximum frame rate is displayed.

14. The apparatus according to claim 9, wherein the processing circuitry is configured to
    set the blinking frequency to the first maximum frame rate when the first portion of the video content having the first maximum frame rate is displayed.

15. The apparatus according to claim 9, wherein the processing circuitry is configured to
    set the blinking frequency to 0 Hz when the second portion of the video content having the second maximum frame rate is displayed.

16. The apparatus according to claim 9, further comprising:
    a receiver configured to receive a terrestrial broadcast signal including the video content; and
    the light source.

17. The apparatus according to claim 9, wherein:
    the first maximum frame rate exceeds a predetermined frame rate of the display, and
    the second maximum frame rate does not exceed the predetermined frame rate of the display.

18. A non-transitory computer-readable medium storing instructions which when executed by a computer cause the computer to perform a method for controlling a light source of a display, the method comprising:
    determining maximum frame rates for different portions of video content to be displayed on the display;
    controlling the light source of the display to blink according to a blinking frequency when a first portion of the video content having a first maximum frame rate is displayed;
    controlling the light source of the display to not blink when a second portion of the video content having a second maximum frame rate is displayed;
    receiving metadata of high dynamic range, and
    displaying the video content at the maximum frame rates and in the high dynamic range, wherein the first maximum frame rate exceeds a predetermined frame rate of the display, and
    the second maximum frame rate does not exceed the predetermined frame rate of the display.

* * * * *